UNITED STATES PATENT OFFICE.

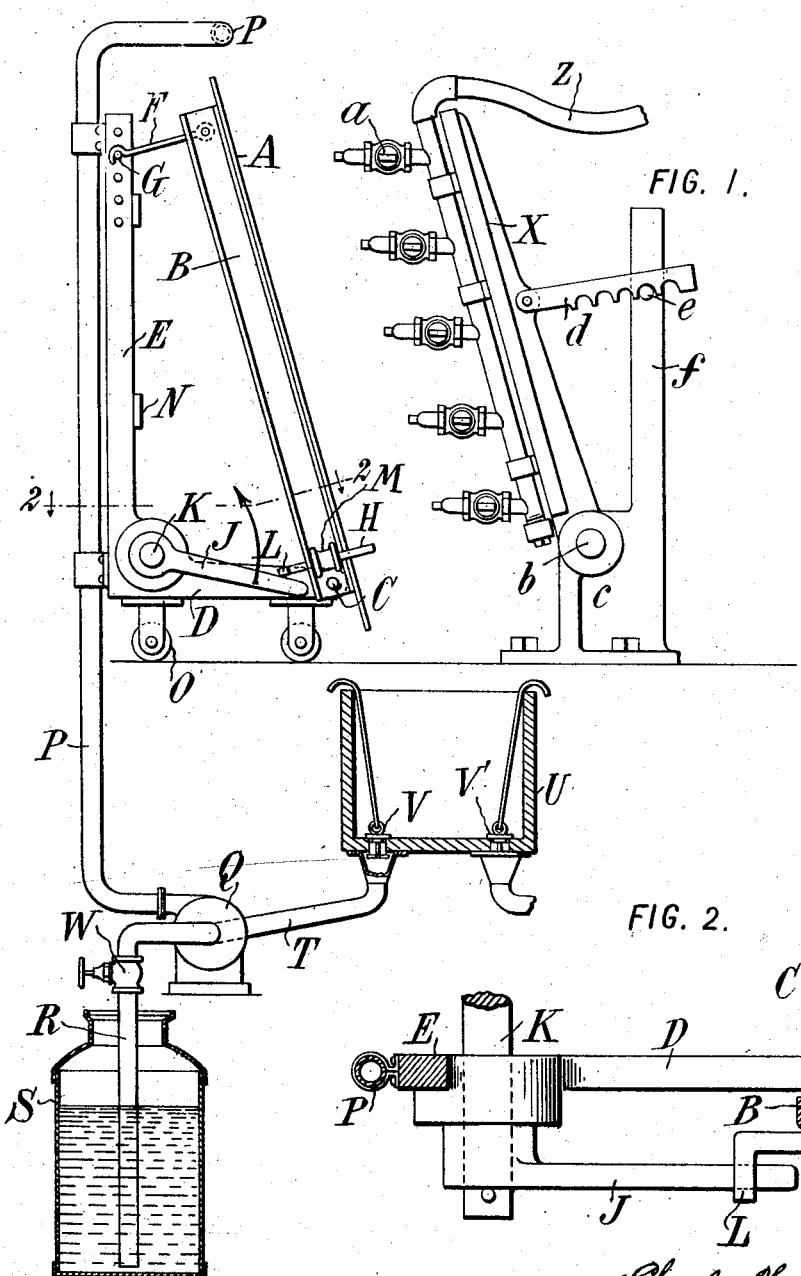

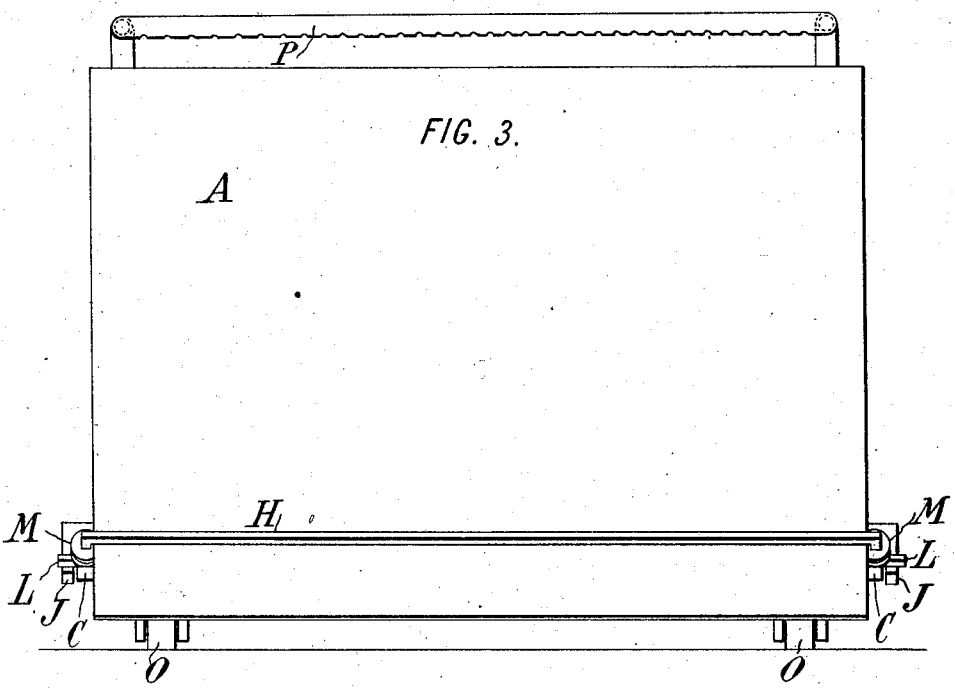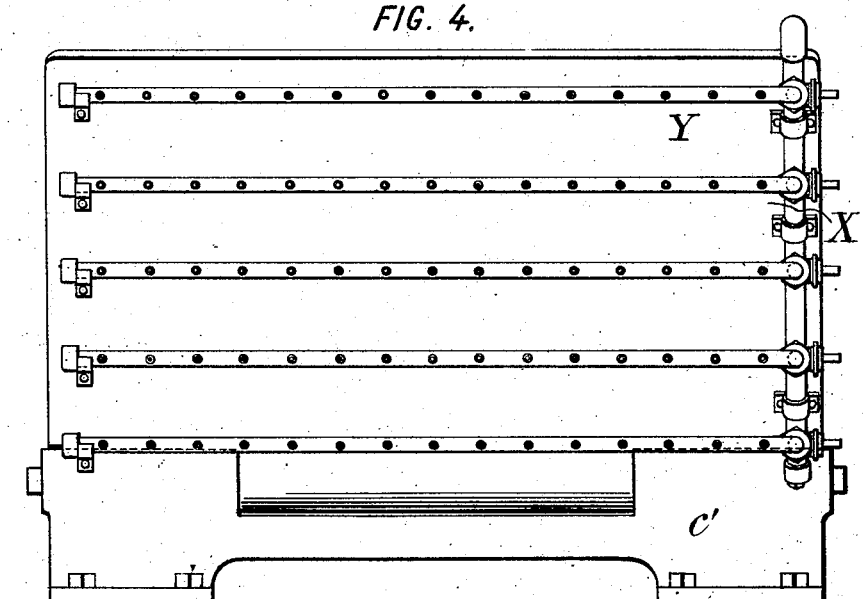

CHARLES H. CAMPBELL, OF NEW YORK, N. Y.

APPARATUS FOR CONCENTRATING MILK, &c.

No. 867,641.      Specification of Letters Patent.      Patented Oct. 8, 1907.

Application filed October 3, 1906. Serial No. 337,320.

*To all whom it may concern:*

Be it known that I, CHARLES H. CAMPBELL, a citizen of the United States, residing in the borough of Manhattan, city, county, and State of New York, have invented certain new and useful Improvements in Apparatus for Concentrating Milk, &c., of which the following is a specification.

This invention aims to provide an improved apparatus for concentrating various liquids, being especially adapted for concentration of milk from the ordinary extremely liquid condition to a semi-liquid or doughy mass or to substantial or complete dryness.

The apparatus is extremely simple and cheap, and is particularly advantageous on account of the ease with which it may be kept clean, and with which it may be adjusted to secure a more or less rapid concentration, and a concentration to a greater or less degree.

The milk is run in a coating or film over an inclined support which is fixed in position during use, and the heat used in concentrating it is applied to the surface of the milk instead of to the support over which it runs, as has been proposed in previous machines. By reason of the low conductivity of the atmosphere in contact with the surface of the milk, the milk is prevented from being raised to an extremely high temperature at any point so as to burn it or cause it to become seriously caked on its support. The support is adjustable toward and from the source of heat, and the temperature is variable from the top to the bottom of the support. By varying the inclination of the support also, the relative temperatures at different points may be varied, and the rate of speed with which the milk flows may be increased or diminished in order to effect a greater or less degree of concentration.

The accompanying drawings illustrate more or less diagrammatically an apparatus embodying the invention.

Figure 1 is a side elevation showing certain parts in section; Fig. 2 is an approximately horizontal section on the line 2—2 in Fig. 1; Fig. 3 is a face elevation of the support which carries the milk; Fig. 4 is a face elevation of the heater.

Referring to the embodiment of the invention illustrated, the support comprises a flat sheet of metal A arranged in an inclined approximately vertical position. The support may be mounted at opposite sides upon channel irons B, the lower ends of which are pivoted as at C to the horizontal arms D of end frames which have also vertical arms E to which the upper ends of the channels B are adjustably connected, as for example by means of hooks F pivoted at one end to the channels B and adapted to hook at their opposite end over any one of a series of pins G at different heights on the vertical frames E.

A scraper H is arranged to move up and down over the lower portion of the support where the milk becomes so thick as not to run down easily, this scraper being reciprocated at intervals either by hand or automatically. A suitable automatic means comprises arms J at opposite ends of a rotating shaft K, these arms engaging arms L connected to the ends of the scraper H, and passing through guide rollers M which travel up and down in the grooves of the channels B. The arms J rotate slowly in the direction of the arrow in Fig. 1, and move the scraper H about half way up the support and then allow it to fall by gravity, the arms J engaging it again at the end of a revolution, and the rollers being stopped by the extended ends of the pivot C.

The end frames E may be connected to each other by means of cross braces N as well as by the shafts C and K, and are preferably mounted on rollers O to permit the support to be moved toward or from the heater bodily.

Instead of being a perfect plane, the support A may be curved in vertical section, the lower part being nearly or quite vertical, while the upper part departs more largely from the vertical so as to compensate for the more easy flow of the more liquid milk at the top of the support.

The milk may be fed to the support through a perforated pipe P, which is bent at its ends and extends down to the discharge end of a pump Q, the inlet end of which may be connected to a pipe R adapted to extend into a milk can or other receptacle S, or it may be alternately connected by means of suitable valves to a pipe T into which milk is discharged from a vessel U arranged below the lower edge of the support A. If the valve V of the vessel U be opened and the valve W be closed, then after the milk has passed over the support A and been partially concentrated, it will be again conducted to the top of the support and run down to be further concentrated. In the usual operation, however, the valve V will be closed and the valve W opened, so that the pipe R will take up fresh milk and the desired concentration will be effected in one passage over the plate A, so that the milk which is run first into the receptacle U will be of the desired degree of concentration. If it is desired to desiccate this milk, it may be conducted from the vessel U by way of valve V' to any suitable desiccating apparatus, such as drying trays or the cylindrical apparatus described in Patent No. 668,162. The pipe P may be fastened upon the upright portions E of the main frame, and the pump Q may also be attached to this main frame so as to move with it, although for the sake of clearness the pump is shown separately in the present case. Where the pump is separate from the main frame, a portion of the pipe P must be flexible to allow of the bodily adjustment referred to.

The heating of the milk may be effected in a great variety of ways. I have shown for this purpose a standard X carrying at different heights a series of perforated pipes Y similar to those used in gas heated ovens, these pipes being supplied with gas from a main Z, and being provided each with a valve $a$, so that the supply of gas may be varied as desired. Ordinarily it will be greatest for the uppermost of the pipes Y, and will vary gradually to the lowest, so as to neutralize the greater tendency of the milk to burn as it becomes thicker. In case the adjustment of the valves $a$ is not sufficient to effect the desired variation in temperatures between the top and the bottom, or in case a heating means is used which is not adapted to regulation by such valves, the standard X will be pivoted at $b$ upon a base $c$, and will be angularly adjustable, the angle being determined for example by a notched link $d$ engaging a pin $e$ on an arm $f$ extending upright from the fixed base $c$. The pipe Z may be flexible to allow of the desired adjustment. The particular value of this adjustment lies in the ability to vary temperature at different heights without at the same time varying the rapidity with which the milk runs down its support. Especially when concentrating milk it is important to avoid such a high temperature as will injure the solids as by coagulating the albumen. The coagulation, however, takes place at a lower temperature, where the mass has little water in it, than where the mass has a large quantity of water. Therefore the desired concentration can be more quickly effected by using the highest temperature which for the condition of the milk at any moment will just fall short of coagulation. As shortness of time is of the greatest importance in the concentration of milk, it being often impossible to get milk perfectly fresh, this adjustability of the degree of temperature is a particularly valuable feature of the machine.
The degree of concentration may be carried to any desired point, even to the point of complete dryness, on the support A. Likewise the scraper H may be arranged to move up the support to any desired height.

What I claim is:—

1. An apparatus for concentrating milk including in combination an approximately vertical inclined support, stationary in operation and adjustable in inclination, means for supplying the milk to the top of said support so that it spreads thereon and runs down the support in a thin coating, and a heater opposite the face of the inclined support so that the milk is heated to a higher degree than its support.

2. An apparatus for concentrating milk including in combination an inclined support, means for supplying the milk to the top of said support so that it spreads thereon and runs down the support in a thin coating, and a heater opposite the face of the inclined support so that the milk is heated to a higher degree than its support, said heater comprising heating devices at different elevations and adapted to be adjusted to different intensities opposite the portions of the milk of different degrees of concentration.

3. An apparatus for concentrating milk including in combination an inclined support, means for supplying the milk to the top of said support so that it spreads thereon and runs down the support in a thin coating, and a heater opposite the face of the inclined support so that the milk is heated to a higher degree than its support, and a scraper arranged to scrape the concentrated milk from the support.

4. An apparatus for concentrating milk including in combination a sheet A constituting a support and arranged in an inclined approximately vertical position and adapted to be adjusted in inclination, means for supplying milk to the top of said support so that it spreads thereon and runs down the support in a thin coating, and a heater opposite the face of the inclined support and comprising a standard X carrying a series of heating devices at different heights.

5. An apparatus for concentrating milk including in combination a support comprising a sheet A, end frames having horizontal arms D and vertical arms E, the sheet A being pivoted near its lower edge to the horizontal arms D, and means for attaching the upper part of the sheet to the vertical arms E and at different distances therefrom so as to vary the inclination, a pipe P arranged to distribute milk upon the sheet A, and a pump Q for forcing the milk through said pipe P.

6. An apparatus for concentrating milk including in combination a support comprising a sheet A, end frames having horizontal arms D and vertical arms E, the sheet A being pivoted near its lower edge to the horizontal arms D, and means for attaching the upper part of the sheet to the vertical arms E and at different distances therefrom so as to vary the inclination, a pipe P arranged to distribute milk upon the sheet A, a pump Q for forcing milk through said pipe P, a receptacle U arranged below the sheet A to receive the material therefrom, and connected with the pump Q to permit the reconcentration of said material.

7. An apparatus for concentrating milk including in combination a stationary inclined support, means for supplying the milk to the top of said support so that it spreads thereon and runs down the support in a thin coating, and a heater opposite the face of the inclined support comprising a standard X pivoted and adjustable in inclination, a series of heating devices Y at different elevations upon said standard, and means for regulating separately the individual heating devices.

In witness whereof, I have hereunto signed my name in the presence of two subscribing witnesses.

CHARLES H. CAMPBELL.

Witnesses:
DOMINGO A. USINA,
FRED WHITE.